US010157163B2

United States Patent
Takahashi

(10) Patent No.: US 10,157,163 B2
(45) Date of Patent: Dec. 18, 2018

(54) COMPUTER SYSTEM, CONNECTION MANAGEMENT METHOD FOR REMOTE DEVICE, AND PROGRAM RECORDING MEDIUM

(71) Applicant: NEC CORPORATION, Tokyo (JP)

(72) Inventor: Masahiko Takahashi, Tokyo (JP)

(73) Assignee: NEC CORPORATION, Minato-ku, Tokyo (JP)

( * ) Notice: Subject to any disclaimer, the term of this patent is extended or adjusted under 35 U.S.C. 154(b) by 37 days.

(21) Appl. No.: 15/318,012

(22) PCT Filed: Jun. 5, 2015

(86) PCT No.: PCT/JP2015/002838
§ 371 (c)(1),
(2) Date: Dec. 12, 2016

(87) PCT Pub. No.: WO2015/190079
PCT Pub. Date: Dec. 17, 2015

(65) Prior Publication Data
US 2017/0116151 A1  Apr. 27, 2017

(30) Foreign Application Priority Data

Jun. 12, 2014  (JP) .................................. 2014-121450

(51) Int. Cl.
*G06F 13/42*  (2006.01)
*G06F 9/46*  (2006.01)
(Continued)

(52) U.S. Cl.
CPC ............ *G06F 13/4282* (2013.01); *G06F 9/46* (2013.01); *G06F 13/102* (2013.01);
(Continued)

(58) Field of Classification Search
CPC ............ G06F 13/4282; G06F 13/4068; G06F 2213/0026; G06F 9/46; G06F 13/102; H04L 61/6022; H04L 61/6004
See application file for complete search history.

(56) References Cited

U.S. PATENT DOCUMENTS

| | | | |
|---|---|---|---|
| 2011/0179418 A1* | 7/2011 | Takebe | G06F 9/45558 718/1 |
| 2012/0036306 A1 | 2/2012 | Miyoshi | |
| 2014/0253321 A1* | 9/2014 | Srinivasan | G08B 13/00 340/539.11 |

FOREIGN PATENT DOCUMENTS

| | | | |
|---|---|---|---|
| JP | 2007-219873 A | 8/2007 | |
| JP | 2008-181387 A | 8/2008 | |

(Continued)

OTHER PUBLICATIONS

JP2008181387A English Translation.*
(Continued)

*Primary Examiner* — Henry Tsai
*Assistant Examiner* — John B Roche
(74) *Attorney, Agent, or Firm* — Sughrue Mion, PLLC

(57) ABSTRACT

This computer system improves the ease with which a guest OS and remote device can be connected in a configuration combining pass-through technology and bus extension technology. The computer system is provided with a bus extending means for constructing a virtual bus to one or more remote devices connected via a network, and an executing means for configuring a virtual hardware environment and executing a host operating system for causing a guest operating system to control the remote device(s). The bus extending means comprises a communication controlling means for consulting a management table for managing relationships of correspondence between the guest operating system and the remote device(s) by using identification
(Continued)

information that does not change depending on the startup state of the remote device(s), and controlling communication between the guest operating system and the remote device(s).

6 Claims, 10 Drawing Sheets

(51) Int. Cl.
  *G06F 13/40* (2006.01)
  *H04L 29/12* (2006.01)
  *G06F 13/10* (2006.01)
(52) U.S. Cl.
  CPC ...... *G06F 13/4068* (2013.01); *H04L 61/6022* (2013.01); *G06F 2213/0026* (2013.01); *H04L 61/6004* (2013.01)

(56) References Cited

FOREIGN PATENT DOCUMENTS

| | | |
|---|---|---|
| JP | 2008181387 A  * | 8/2008 |
| JP | 2010-237737 A | 10/2010 |
| JP | 2011-145827 A | 7/2011 |
| JP | 2011-145912 A | 7/2011 |
| JP | 2012-038037 A | 2/2012 |

OTHER PUBLICATIONS

International Search Report for PCT/JP2015/002838 dated Aug. 25, 2015 [PCT/ISA/210].
Written Opinion for PCT/JP2015/002838 dated Aug. 25, 2015 [PCT/ISA/237].

* cited by examiner

Fig. 5

| MAC ADDRESS | VENDOR ID | DEVICE ID | CORRESPONDING GUEST OS |
|---|---|---|---|

Fig. 6

| MAC ADDRESS | VENDOR ID | DEVICE ID | CORRESPONDING GUEST OS |
|---|---|---|---|
| AA::AA | 0xabcd | 0x1234 | A |
| BB::BB | 0xabcd | 0x1234 | B |
| AA::AA | 0xcdef | 0x9876 | B |

-RELATED ART-

-RELATED ART-

-RELATED ART-

COMPUTER SYSTEM, CONNECTION MANAGEMENT METHOD FOR REMOTE DEVICE, AND PROGRAM RECORDING MEDIUM

CROSS REFERENCE TO RELATED APPLICATIONS

This application is a National Stage of International Application No. PCT/JP2015/002838 filed Jun. 5, 2015, claiming priority based on Japanese Patent Application No. 2014-121450 filed Jun. 12, 2014, the contents of all of which are incorporated herein by reference in their entirety.

TECHNICAL FIELD

The present invention relates to a computer system, a connection management method for a remote device, and a program recording medium, and particularly relates to a computer system, a connection management method for a remote device, and a program recording medium which perform input and output with a remote device via a network.

BACKGROUND ART

A computer includes a CPU (Central Processing Unit) and a device which are connected each other via a system bus (hereinafter, referred to as 'bus' in some cases), and accesses the device according to an instruction of a program executed on the CPU. The access to the device is referred to as 'input/output process' or 'I/O process'. Meanwhile, software which controls the device is referred to as an 'OS (Operating System)'. Especially, software, which controls the device, out of OSs is referred to as a 'device driver'. Moreover, a plurality of user programs are executed on the OS by control of the OS. In order that the user program may not access the device directly, there is a difference in execution authority between the OS and the user program.

Xeon® or Atom of Intel Corporation are examples of the CPU. Linux®, Windows® of Microsoft Corporation or the like is an example of the OS. Moreover, PCI (Peripheral Component Interconnect), PCI-Express or the like is an example of the system bus. Furthermore, a hard disk drive (HDD), a network interface card (NIC), and the like are examples of the devices.

The devices are scanned at a start-up time of the computer by BIOS (Basic Input/Output System), and are assigned IDs (Identifiers), memory areas and the like. At this time, the devices are not in an available state. After a start-up of the OS, by a device driver working for a device, to be operated by the OS, out of scanned devices, the device is initialized. By executing the initialization, the device enters into the available state. A set of 'bus number/device number/function number (BDF) is an example of ID, and it is possible to uniquely specify the device, which is connected with the computer, by using the set. This set is a logical number, and may be changed in some cases according to the number, a configuration, or a scanning order of the devices.

As a method for accessing the device for the running OS, two access methods are known. That is, one is the access method by issuing an I/O instruction and the other is the access method by MMIO (Memory-Mapped I/O). According to the former method, the I/O instruction is defined as an instruction set of the CPU. Therefore, the I/O instruction is outputted on the bus by the program's issuing the CPU instruction, and the access to the device is executed. Meanwhile, according to the latter method, when the OS accesses a specified memory address, the CPU or a chipset which controls the bus converts the memory address into an I/O process and outputs the I/O process on the bus. As a result, the access to the device is executed. As mentioned above, when BIOS scans the devices, since a size of memory space which the device requests is assigned in physical memory space, a memory access to the assigned physical memory space is converted into the I/O instruction. Hereinafter, the above-mentioned two methods for device access are collectively referred to as 'I/O instruction'. When accessing the device, the memory address, ID or the like which identifies the device is designated by the I/O instruction.

Recently, CPU's advance in performance permits some software overheads. Consequently, it is possible to make hardware virtualized, and to make a plurality of virtual hardware environments work on a single CPU.

FIG. 9 is a block diagram exemplifying a configuration of a virtualized computer which makes such virtual hardware environments work. The OS which manages the virtual hardware environment shown in FIG. 9 is referred to as a host OS X110. Meanwhile, the OS which is executed in the virtual hardware environment is referred to as a guest OS. While the number of the host OSs X110 is one, it is possible to execute a plurality of the guest OSs (refer to signs X101-X10n). Moreover, the guest OS may be different in a kind from the host OS X110, and the guest OS may be different in a kind from the other guest OSs. As an example of the host OS X110 which provides the virtual hardware environment, kvm, VMWare® or the ESXi server of VMWare Inc., or the like is known.

Generally, in the virtualized environment, instead of making the gust OS directly recognize a device B X131 which is connected with the host OS X110, a virtualized device A (hereinafter, referred to as 'virtual device') is provided to the guest OS (for example, the guest OS X101). That is, a device driver B, which the host OS X110 has, controls the device B X131. Meanwhile, a device driver A, which the guest OS (for example, the guest OS X101) has, controls the virtual device A. At this time, the host OS X110 converts an I/O instruction, which the device driver A of the guest OS (for example, the guest OS X101) issues, in such a way that a device driver of the device B X131 can decode the I/O instruction.

Meanwhile, PTL 1 discloses 'pass-through technology' managing the device by not the host OS but a device driver of the guest. According to the technology described by PTL 1, it is possible that the guest OS in place of the host OS can control some devices which are connected with the computer.

Moreover, PTL 2 discloses a technology for extending the bus virtually. According to the technology described by PTL 2, it is possible to physically extend a distance between CPU and the device by transferring data, which flow on PCI-Express, through a network based on Ethernet® or the like. The PCI-Express bus transfers data in a form of packet. Here, the packet is a unit of a transfer for communication between two points, and generally a source address and a destination address are embedded in the packet.

FIG. 10 is a block diagram showing a configuration of a computer which applies the bus extension technology described by PTL 2. Referring to FIG. 10, according to the technology described by PTL 2, an upstream bridge X140 is arranged to connect to a CPU X120, and a downstream bridge X420 is arranged to connect to a device (peripheral equipment X130). Each of the bridges X140 and X420 encapsulates a packet, and de-capsulates the encapsulated packet (that is, releases encapsulation). By the above-mentioned encapsulation, it is possible to make data on the bus transferred through an Ethernet® network. Since also the Ethernet network transfers data in a form of packet, hereinafter, a packet which flows on a network is referred to as a 'network packet'.

PTL 3 discloses a method for facilitating connection of a USB (Universal Serial Bus) device in a virtualized environment. Specifically, PTL 3 discloses a virtual bus system having a device management unit which determines whether or not enumeration can be executed by referring to a permission list and a device management table for managing a connection state of another device.

CITATION LIST

Patent Literature

[PTL 1] Japanese Patent Application Laid-Open Publication No. 2010-237737
[PTL 2] Japanese Patent Application Laid-Open Publication No. 2007-219873
[PTL 3] Japanese Patent Application Laid-Open Publication No. 2011-145827

SUMMARY OF INVENTION

Technical Problem

It is assumed that all disclosures of the above-mentioned patent documents are incorporated and described in the present DESCRIPTION by reference. The following analysis is achieved by the present inventor. By combining the pass-through technology (FIG. 9) described by PTL 1, and the bus extension technology (FIG. 10) described by PTL 2, it is possible to realize a computer system in which the guest OS directly controls the remote device connected through the network. FIG. 11 shows an example of a plurality of remote apparatuses and a plurality of the guest OSs are directly connected by using the pass-through technology. Since the remote apparatuses may be arranged at locations different each other in some cases, a certain guest OS must be associated with the same remote apparatus every time. In the case of the example shown in FIG. 11, a guest OS-A controls a device A (bus number/device number/function number are 1/0/0 respectively), and a guest OS-B controls a device B (bus number/device number/function number are 2/0/0 respectively).

However, according to the configuration which combines the pass-through technology and the bus extension technology, there is a problem that, in the case that some remote devices out of the plural remote devices are not started up, a method for designating the remote device, which is associated with the guest OS, is changed. For example, in the case of the example shown in FIG. 11, when a remote apparatus X20A is not started up, bus number/device number/function number of a device B existing in a remote apparatus B is changed from 2/0/0 to, for example, 1/0/0 respectively. Therefore, there is a possibility that the guest OS-A controls the device B. This is because a logical number is used for assigning the device number on the assumption that the identical device is included in the identical configuration (all of the devices are always started up) every time. Accordingly, a technique is proposed to provide a way in which the method for the guest OS's designating the remote device is not changed even if some remote devices out of the plural remote devices are not started up.

An object of the present invention is to improve easiness of connection between the guest OS and the remote device in a configuration combining the pass-through technology and the bus extension technology.

Solution to Problem

According to a first aspect, a computer system includes: a bus extending unit which constructs a virtual bus to one or more remote devices connected via a network; and an executing unit which configures a virtual hardware environment and executes a host operating system for causing a guest operating system to control the remote device, wherein the bus extending unit comprises a communication controlling unit which controls communication between the guest operating system and the remote devices by referring to a management table for managing correspondence between the guest operating system and the remote devices using identification information that does not change dependently on start-up states of the remote devices is provided.

According to a second aspect, a connection management method for a remote device in a computer system including a bus extending unit which constructs a virtual bus to one or more remote devices connected via a network and an executing unit which configures a virtual hardware environment and executes a host operating system for causing a guest operating system to control the remote devices, the method includes: transferring a scan instruction issued by the guest operating system to the remote devices by referring to a management table for managing correspondence between the guest operating system and the remote devices by using identification information that does not change dependently on start-up states of the remote devices; and selecting a reply to be transferred to the guest operating system, out of replies sent back by the remote devices by referring to the management table is provided.

According to a third aspect, a computer-readable program recording medium for recording a program executed by a computer, which is arranged in a computer system including a bus extending unit which constructs a virtual bus to one or more remote devices connected via a network and an executing unit which configures a virtual hardware environment and executes a host operating system for causing a guest operating system to control the remote devices, the computer executing: a process of transferring a scan instruction issued by the guest operating system to the remote devices by referring to a management table for managing correspondence between the guest operating system and the remote devices by using identification information that does not change dependently on start-up states of the remote devices; and a process of selecting a reply to be transferred to the guest operating system, out of replies sent back by the remote devices by referring to the management table.

Advantageous Effects of Invention

According to the present invention, it is possible to improve easiness of connection between the guest OS and the remote device in a configuration combining the pass-through technology and the bus extension technology.

BRIEF DESCRIPTION OF DRAWINGS

FIG. 5 is a diagram showing an example of entry composition of a device management table which the computer system of the first exemplary embodiment of the present invention includes.

FIG. 6 is a diagram showing a setting example of the device management table which the computer system of the first exemplary embodiment of the present invention includes.

DESCRIPTION OF EMBODIMENTS

Figure 1:
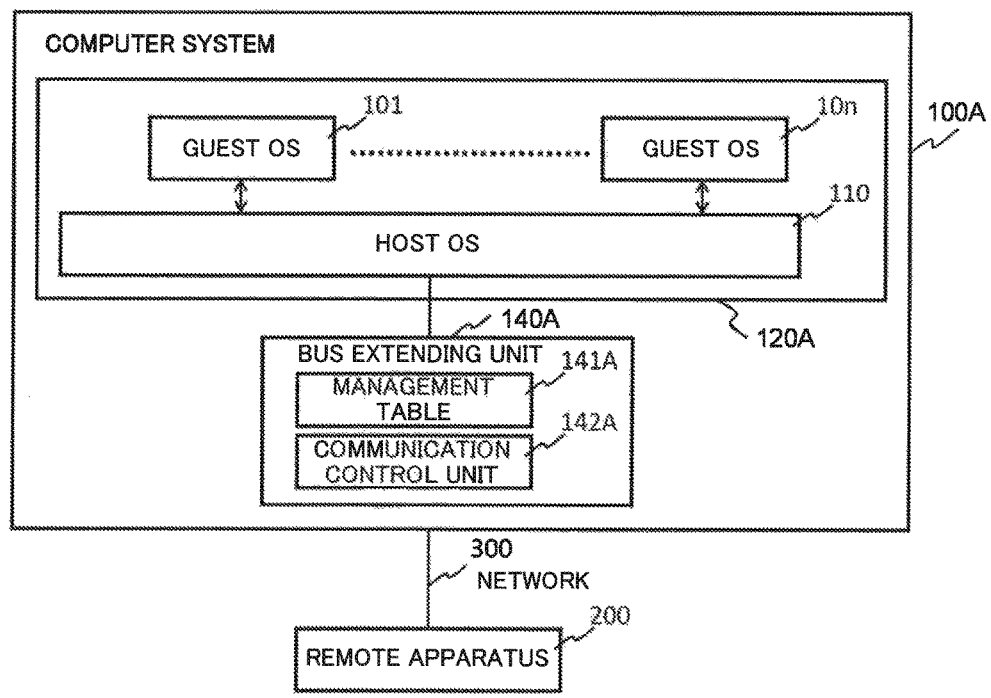
FIG. 1 is a diagram showing a configuration of an exemplary embodiment of the present invention.

Firstly, an outline of an exemplary embodiment of the present invention will be described with reference to drawings. Here, a reference sign of the drawing, which is added supplementally to the outline, is assigned to each element for the sake of convenience as an example helpful in understanding, and it is not intended to limit the present invention to an aspect shown in the drawing.

The present invention can be realized by a computer system including a bus extending unit 140A, an OS executing unit 120A and a communication control unit 142A, which are shown in FIG. 1, in the exemplary embodiment. The bus extending unit 140A constructs a virtual bus to one or more remote devices which are connected through a network. The OS executing unit 120A constructs a virtual hardware environment and executes a host OS 110 which causes each of guest OSs 101-10n to control the remote devices. The communication control unit 142A controls communication between the guest OSs 101-10n and the remote devices.

More specifically, the communication control unit 142A controls communication between the guest OSs 101-10n and the remote devices by referring to a management table 141A, which manages correspondence between the guest OSs 101-10n and the remote devices by using identification information not changing dependently on start-up states of the remote devices.

As mentioned above, the computer system of the present exemplary embodiment manages the correspondence between the guest OS and the remote device by using the identification information which does not change dependently on the start-up states of the remote devices. As a result, it is possible that the guest OS designates the remote device with accuracy even in the case that some remote devices are not started up.

FIRST EXEMPLARY EMBODIMENT

Next, a first exemplary embodiment of the present invention will be described in detail with reference to drawings. Here, a reference sign of the drawing, which will be supplementally added hereinafter, is exemplified just for a help in understanding, and it is not intended to limit the present invention to an aspect shown in the drawing.

Figure 2:
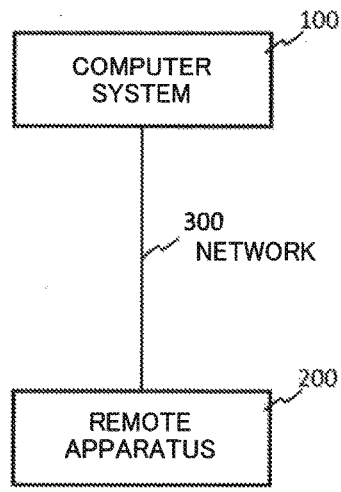
FIG. 2 is a diagram showing a configuration of a first exemplary embodiment of the present invention.

FIG. 2 is a diagram showing a configuration of the first exemplary embodiment of the present invention. As shown in FIG. 2, a computer system 100 and a remote apparatus 200 are connected each other through a network 300.

Figure 3:
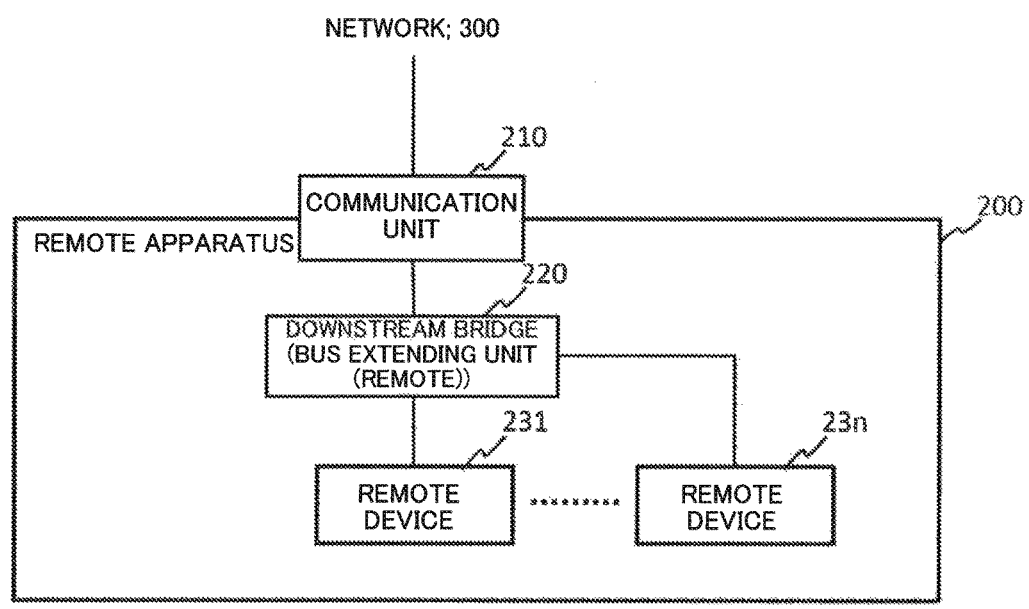
FIG. 3 is a block diagram showing a configuration of a remote apparatus of the first exemplary embodiment of the present invention.

FIG. 3 is a block diagram exemplifying a configuration of the remote apparatus 200. Hereinafter, the configuration of the remote apparatus 200 will be described in detail with reference to FIG. 3.

The remote apparatus 200 includes a communication unit 210, a downstream bridge (bus extending unit (remote)) 220 and n (n is an integer equal to or larger than 1) remote devices 231 to 23n. Each of the remote devices 231 to 23n may a device which is connected with a system bus. Each of the remote devices 231 to 23n is, for example, a hard disk, a network interface card or the like which can be directly connected with the bus.

The downstream bridge (bus extending unit (remote)) 220 forms a pair with an upstream bridge (bus extending unit (host)) which is arranged on the computer system side and will be described later. The downstream bridge (bus extending unit (remote)) 220 executes de-capsulation for data which should be transmitted toward the remote devices 231 to 23n, and executes encapsulation for data on the bus which are transmitted by the remote devices 231 to 23n. Moreover, the downstream bridge (bus extending unit (remote)) 220 may have a function such as transmission rate control, retransmission control which is used when a packet is lost on the network, or the like.

The communication unit 210 is an interface unit for communicating through the network 300. Ethernet®, Infini-Band, or the like is an example of the network 300. However, these networks are only examples. The network 300 has no limitation as far as the bus extension technology, which is described as Background Art, is applicable between the computer system 100 and the remote apparatus 200.

The communication unit 210 of the remote apparatus 200 is assigned an address (for example, MAC (Media Access Control) address) which can be identified uniquely on the network 300. In the present exemplary embodiment, the MAC address is used as identification information which does not change dependently on a start-up states of the remote devices (described in detail later).

The downstream bridge (bus extending unit (remote)) 220 transmits heartbeat (HB: Heart Beat) information intermittently towards the network 300 via the communication unit 210. Generally, the heartbeat information is broadcasted. However, when identifying an address of the host in advance, the downstream bridge (bus extending unit (remote)) 220 may transmit the heartbeat information only to the host which is identified by the address. The heartbeat information includes information on the remote devices 231-23n which are arranged in the remote apparatus 200, and the MAC address of communication unit 210.

Figure 4:
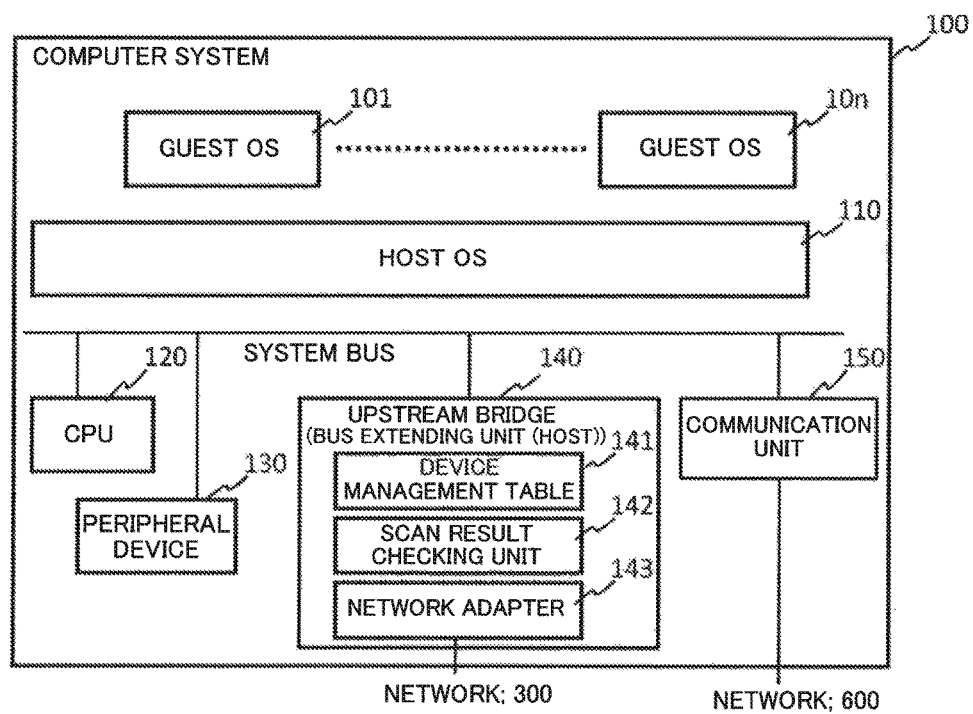
FIG. 4 is a block diagram showing a configuration of a computer system of the first exemplary embodiment of the present invention.

FIG. 4 is a block diagram showing a configuration of the computer system 100 of the present exemplary embodiment.

Referring to FIG. 4, the computer system 100 includes a CPU 120, a peripheral device 130, an upstream bridge (bus extending unit (host)) 140 and a communication unit 150. Moreover, the CPU 120 executes various programs including the host OS 110 and the guest OS 101-10n (n is an integer equal to or larger than 1).

The peripheral device 130 is a device which can be connected with the system bus.

The upstream bridge (bus extending unit (host)) 140 is paired with the downstream bridge (bus extending unit (remote)) 220 of the remote apparatus 200. When transmitting a data packet, which flows on the bus, toward the network 300, the upstream bridge (bus extending unit (host)) 140 encapsulates the data packet and transmits the encapsulated data packet. Meanwhile, when receiving the encapsulated network packet from the network 300, the upstream bridge (bus extending unit (host)) 140 resolves the encapsulation (decapsulates) and transfers the data packet to the guest OSs 101-10n or the system bus.

As a communication protocol which is used between the upstream bridge (bus extending unit (host)) 140 and the downstream bridge (bus extending unit (remote)) 220, TCP (Transmission Control Protocol)/IP (Internet Protocol) or the like is applicable. However, TCP/IP is an example, and the communication protocol is not limited to TCP/IP.

The computer system 100 includes the host OS 110. The host OS 110 provides a virtual hardware environment to the guest OS s 101-10n executing I/O processes with the devices (remote device 231 to 23n) respectively which are included in the remote apparatus 200. The host OS 110 controls the upstream bridge (bus extending unit (host)) 140 to encapsulate an I/O instruction which each of the guest OSs 101-10n issues, and to transmit the encapsulated I/O instruction toward the remote apparatus 200 as a packet. Here, in the case that it is unnecessary to distinguish each of the guest OSs 101-10n, the guest OSs 101-10n are collectively denoted as a 'guest OS 10x'.

When receiving a reply packet, which is a reply to the transmitted packet, from the remote apparatus 200, the upstream bridge (bus extending unit (host)) 140 decapsulates the reply packet to extract data, and transfers the extracted data to the guest OS 10x.

The communication unit 150 is an interface for connection with a network 600 which is different from the network 300 connected with the communication unit 210 of the remote apparatus 200.

The guest OS 10x includes device drivers for controlling the remote devices 231 to 23n of the remote apparatus 200 respectively. Here, it is not necessary that the guest OS 10x includes the device drivers corresponding to all of the remote devices 231 to 23n, and the gust OS 10x may include the device drivers which can control required remote devices out of the remote device 231 to 23n.

The upstream bridge (bus extending unit (host)) 140 of the present exemplary embodiment includes a device management table 141, a scan result checking unit 142 and a network adaptor 143.

FIG. 5 is a diagram showing composition of an entry of the device management table 141. The device management table 141 is a table which designates a combination of the guest OS and the remote device in advance. In the case of the example shown in FIG. 5, the device management table 141 can store an entry including an MAC address, a vendor ID, a device ID and a corresponding guest OS which are associated each other.

The Vendor ID and the device ID are numbers to identify the remote devices 231 to 23n which exist in the remote apparatus 200. When the devices of the vendor IDs or the device IDs belong to the same kind, the vendor IDs or the device IDs have the same ID. The MAC address is a MAC address of the communication unit of the remote apparatus including the device. The corresponding guest OS indicates an identifier of the guest OS combined with the remote device, which is designated by the entry, out of the remote devices 231 to 23n of the remote apparatus 200 (the guest OS has a right to access the remote device out of the remote devices 231 to 23n).

FIG. 6 shows a specific setting example of the device management table 141. In the example of FIG. 6, information on a remote device of a remote apparatus 200 whose MAC address of the communication unit 210 is 'AA::AA' and a remote device of a remote apparatus 200 whose MAC address of the communication unit 210 is 'BB::BB' is set.

For example, a remote device, whose the MAC address, the vendor ID and the device ID are 'AA::AA', '0xabcd' and '0x1234' respectively, is assigned a guest OS-A as the corresponding guest OS. Similarly, a remote device, whose the MAC address, the vendor ID and the device ID are 'BB::BB', '0xabcd' and '0x1234' respectively, is assigned a guest OS-B as the corresponding guest OS. As mentioned above, even if the vendor IDs have the same ID or the device IDs have the same ID, it is possible to distinguish the devices by using the MAC address, and consequently it is possible to associate the vendor ID and the device ID with the guest OS.

Moreover, another remote device, whose the MAC address, the vendor ID and the device ID are 'AA::AA', '0xcdef' and '0x9876' respectively, is assigned the gust OS-B as the corresponding guest OS.

In the case of the setting shown in FIG. 6, when a device scan instruction is issued by the guest OS-A, a scan result (reply) of the remote device, whose the vendor ID, and the device ID are '0xcdef' and '0x9876' respectively, reaches the upstream bridge (bus extending unit (host)) 140. When, by referring to the device management table 141 shown in FIG. 6, the scan result checking unit 142 of the upstream bridge (bus extending unit (host)) checks that the combination is not permitted, the scan result checking unit 142 discards the scan result (reply). At this time, the scan result checking unit 142 sends back error information to the guest OS-A. Therefore, the guest OS-A does not recognize the device whose the vendor ID and the device ID are '0xcdef' and '0x9876' respectively.

Here, in the examples shown in FIG. 5 and FIG. 6, the MAC address of the communication unit 210 of the remote apparatus is used as the identification information which does not change dependently on the start-up states of the remote devices. However, the identification information which does not change dependently on the start-up states of the remote devices is not limited to the MAC address, and identification information which is different from the MAC address and which is assigned to the remote apparatus may be used in place of the MAC address.

Figure 12:
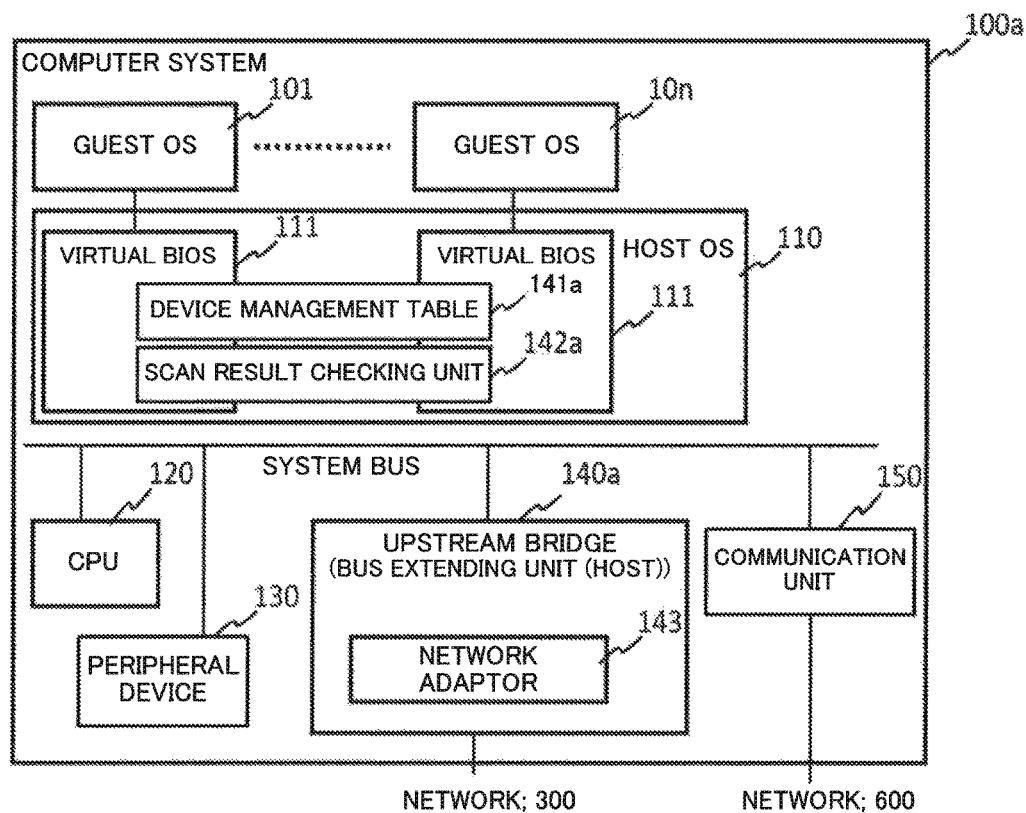
FIG. 12 is a diagram showing a configuration of a modification of the present invention.

Here, the scan result checking unit 142 of the computer system 100 shown in FIG. 4 can be realized by a computer program which works on the host OS 110. Moreover, the device management table 141 and the scan result checking unit 142 can be incorporated in a virtual BIOS (Basic Input/Output System) which the host OS 110 provides. FIG. 12 is a diagram showing a configuration of a computer system 100a according to a configuration of a modification of the exemplary embodiment. In the case of the example shown in FIG. 12, a device management table 141a and a scan result checking unit 142a are incorporated in a virtual BIOS 111 which the host OS 110 provides.

Figure 7:
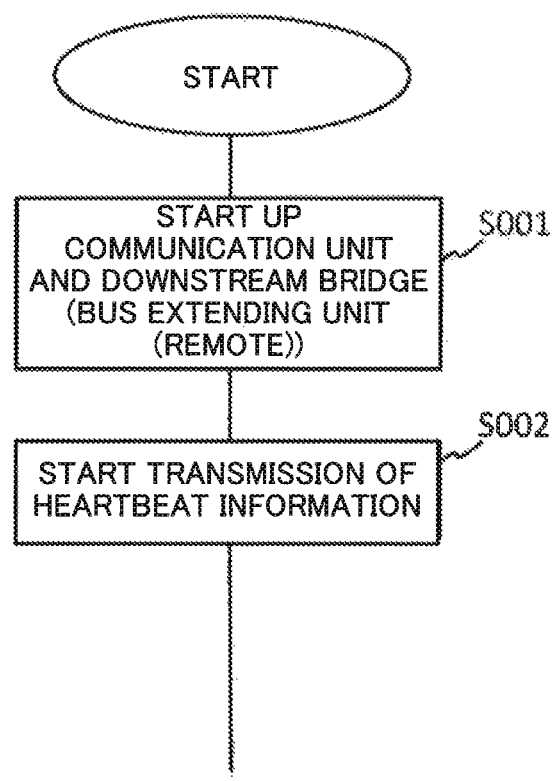
FIG. 7 is a flowchart showing an operation of the remote apparatus of the first exemplary embodiment of the present invention.

Next, an operation of the exemplary embodiment will be described in detail with reference to drawings. In the following explanation, it is assumed that the remote apparatus 200 is started up before the start-up of the computer system 100. FIG. 7 is a flowchart showing an operation executed after the start-up of the remote apparatus of the present exemplary embodiment. Referring to FIG. 7, firstly, the communication unit 210 and the downstream bridge (bus extending unit (remote)) 220 of the remote apparatus 200 are started up (Step S001). At this point of time, each of the remote devices 231 to 23n receives electric power to make an own power source voltage turn ON, but only initialization of the remote devices 231 to 23n by hardware is executed, and initialization by the device driver is not executed.

Next, the downstream bridge (bus extending unit (remote)) 220 starts intermittent transmission of the packet, in which the heartbeat information is embedded, toward the network 300 via the communication unit 210 (Step S002). In the case that the host OS 110 of the computer system 100 is not started up, the heartbeat information is discarded on the network 300 without being received.

Figure 8:
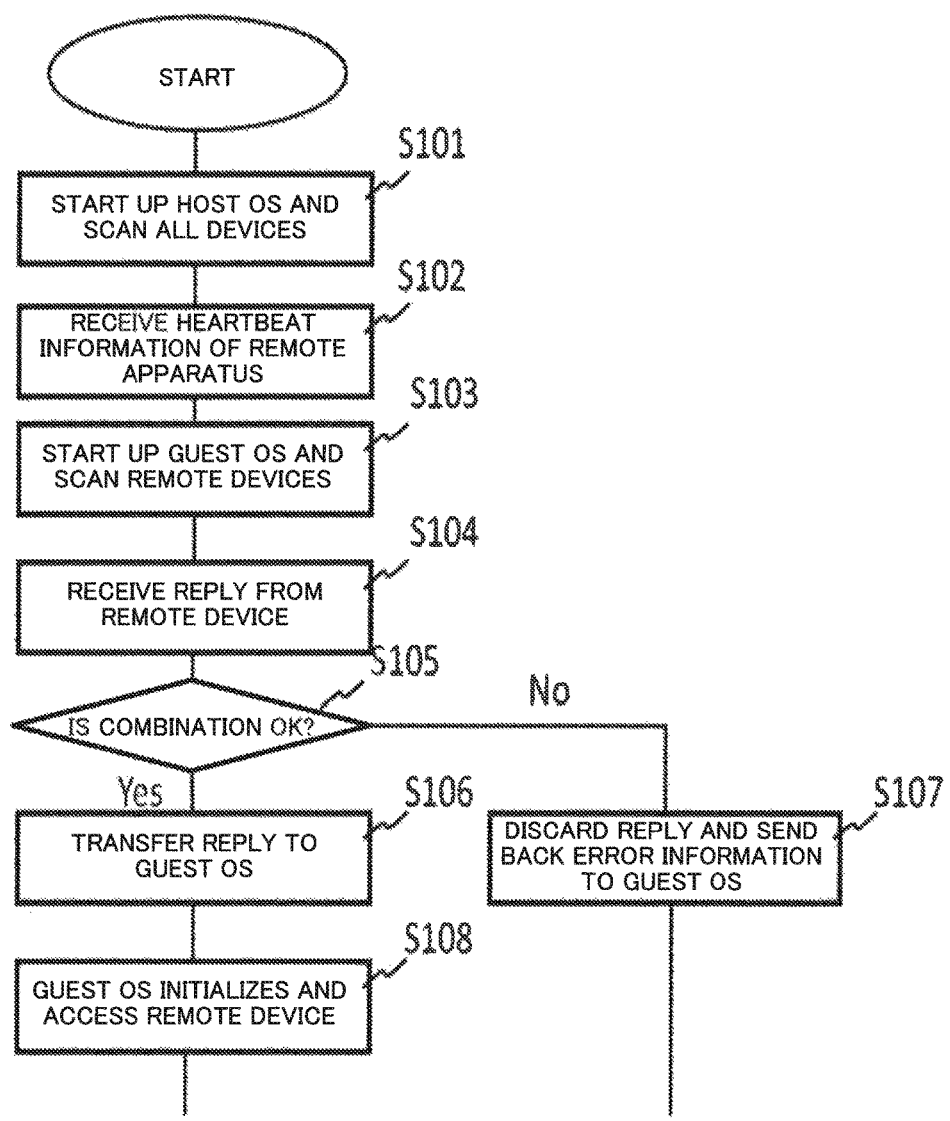
FIG. 8 is a flowchart showing an operation of the computer system of the first exemplary embodiment of the present invention.
Figure 9:
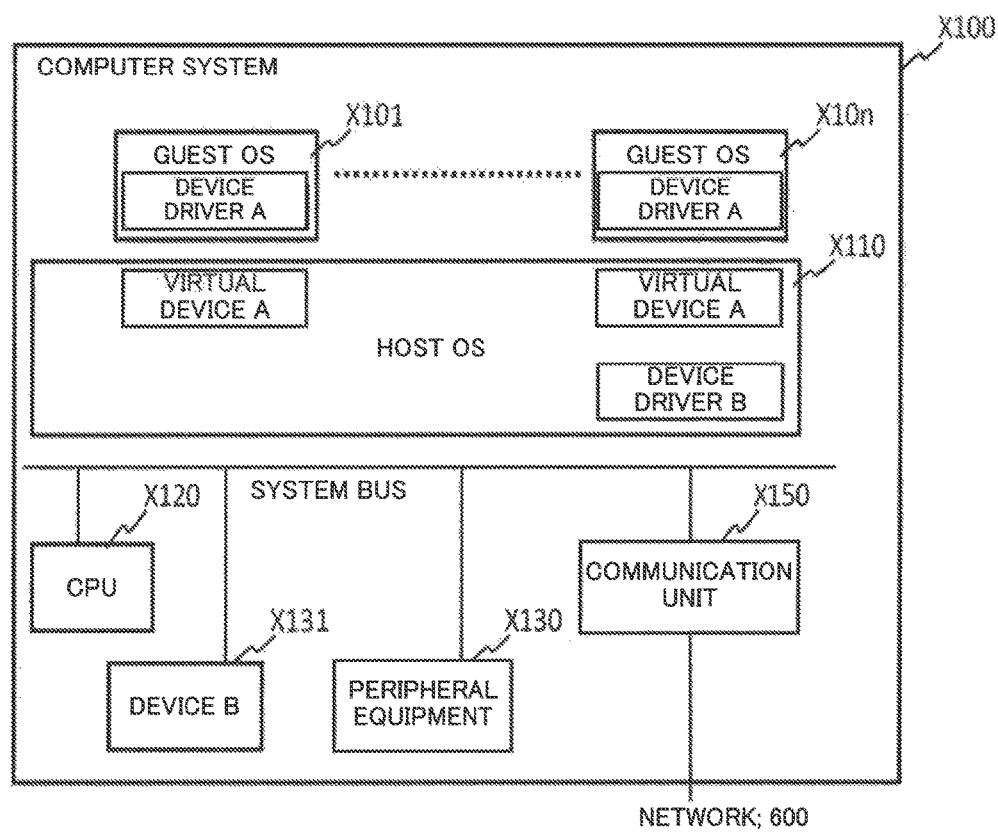
FIG. 9 is a block diagram for describing a configuration of a virtualized computer.
Figure 10:
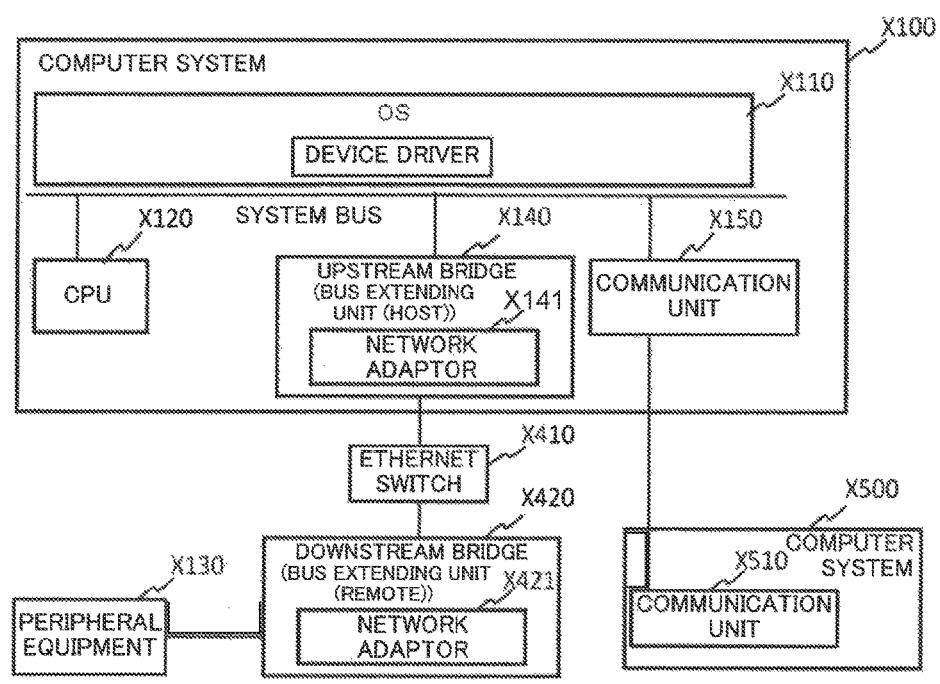
FIG. 10 is a block diagram for describing a configuration of a computer system which uses the bus extension technology.
Figure 11:
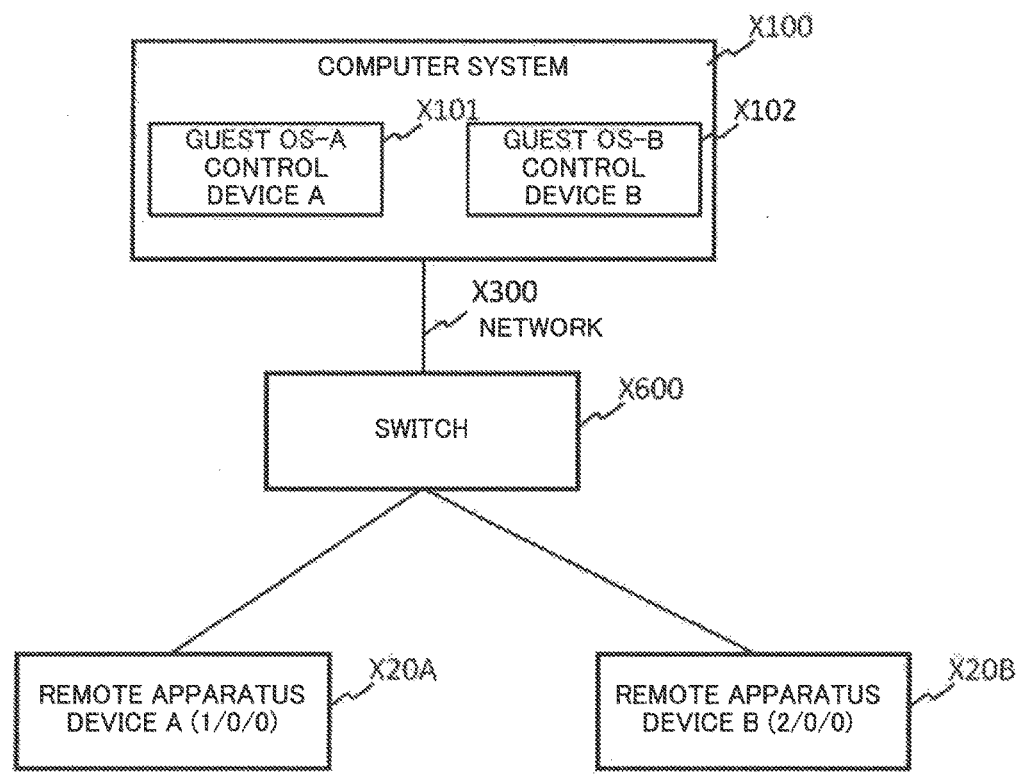
FIG. 11 is a reference diagram for describing a problem of the present invention.

Next, an operation of the computer system 100, which is executed after the start-up of the computer system 100, will be described. FIG. 8 is a flowchart showing the operation of the computer system 100 of the present exemplary embodiment. When the computer system 100 is started up, the host OS 110 is firstly started up (Step S101). The host OS 110 initializes the peripheral device 130 and the communication unit 150 which are included by the computer system 100, and scans the remote devices 231 to 23n through the upstream bridge (bus extending unit (host)) 140 at the same time. Accordingly, the communication unit 150 of the computer system 100 becomes available. However, it is not necessary to initialize the remote devices 231 to 23n of the remote apparatus 200.

Since the remote apparatus 200 has been already started up as mentioned above, the upstream bridge (bus extending unit (host)) 140 receives the heartbeat information which is transmitted by the remote apparatus 200 (Step S102). By receiving the heartbeat information, the upstream bridge (bus extending unit (host)) 140 can recognize the remote devices 231 to 23n which are connected with the remote apparatus 200 and can acquire information on the remote devices 231 to 23n which are connected with the remote apparatus 200. Moreover, the upstream bridge (bus extending unit (host)) 140 acquires the MAC address of the communication unit 210 of the remote apparatus 200 based on the heartbeat information.

Next, when any guest OS 10x is started up, the guest OS 10x issues an instruction for scanning the devices (step S103). The upstream bridge (bus extending unit (host)) 140, by retrieving the device management table 141, designates the MAC address of the communication unit 210 of the remote apparatus 200 having the guest OS 10x which is permitted, and issues the device scan instruction. Since the MAC address of the communication unit 210 is a uniquely determined ID as mentioned above, even if some of the plural remote apparatuses 200 are not started up, a combination of the guest OS 10x and the remote apparatus 200 does not change.

The remote apparatus 200 which has received the device scan instruction replies classification of the device to a source of the device scan instruction. As the reply on the classification of the device, a combination of 'vendor ID and device ID' shown in FIG. 5 and FIG. 6 is exemplified. Apparently, 'vendor ID and device ID' is a mere example of the reply. The remote apparatus 200 may transmit device classification information instead of 'vendor ID and device ID', and may add other pieces of information.

When the scan result checking unit 142 of the upstream bridge (bus extending unit (host)) 140 receives the reply on the classification of the device, the scan result checking unit 142 refers to the device management table and determines whether or not a combination of the classification of the device with the guest OS 10x is permitted (Steps S104 to S105). In the case that a combination of the classification of the device and the guest OS 10x is the permitted combination (Yes in Step S105), the scan result checking unit 142 sends back the scan result to the guest OS 10x (Step S106). The guest OS 10x which has detected the remote device initializes the remote device by use of the device driver, and accesses the remote device if necessary (Step S108).

On the other hand, in the case that a combination of the classification of the device and the guest OS 10x is not the permitted combination (No in Step S105), the scan result checking unit 142 discards the scan result, and sends back the error information (the device is not detected) to the guest OS 10x (Step S107).

As mentioned above, the present exemplary embodiment achieves a remarkable effect that, even if some out of one or more remote apparatuses 200 are not started up, it is unnecessary to change the method for designating the remote apparatus 200 which is assigned to the guest OS 10x. The effect is achieved by using the identifier (MAC address) specific to the communication unit 210 of the remote apparatus 200 as the identification information for identifying the remote device. Moreover, even if the upstream bridge (bus extending unit (host)) 140a does not include the device management table 141 and the scan result checking unit 142, the configuration shown in FIG. 12 can achieve the same effect.

While each exemplary embodiment of the present invention has been described, the present invention is not limited to the above-mentioned exemplary embodiments, and it is possible to add a further modification, replacement and adjustment without departing from the basic technical concept of the present invention. For example, the configuration of the network, the configuration of each element and the description form of the message, which are shown in each drawing, are examples for assisting in understanding the present invention, and the present invention is not limited to the configuration shown in each the drawing.

Finally, a preferred form of the present invention will be summarized.

[First Form]

A computer system, including:

a bus extending unit which constructs a virtual bus to one or more remote devices connected via a network; and an executing unit which configures a virtual hardware environment and executes a host operating system for causing a guest operating system to control the remote devices, wherein the bus extending unit comprises a communication controlling unit which controls communication between the guest operating system and the remote devices by referring to a management table for managing correspondence between the guest operating system and the remote devices using identification information that does not change dependently on start-up states of the remote devices.

[Second Form]

The computer system of the first form, wherein the communication control unit functions as a scan result checking unit which discards, out of replies sent back by the remote devices in reply to a scan instruction issued by a guest operating system, a reply sent back by a remote device not associated with the guest operating system issuing the scan instruction, by referring to the management table.

[Third Form]

The computer system of the first or the second form, wherein, in a case where the guest operating system issues the scan instruction, the communication control unit rewrites a destination of the scan instruction to a MAC address which is embedded in heartbeat information received from a remote apparatus including the remote device and transfers the scan instruction using the MAC address as the identification information.

[Fourth Form]

The computer system of any one of the first to the third forms, the remote devices are PCI-Express devices subject to the PCI-Express protocol, and the bus extending unit constructs the virtual bus to the remote devices by executing encapsulation based on the PCI-Express protocol.

[Fifth Form]

A connection management method for a remote device in a computer system including a bus extending unit which constructs a virtual bus to one or more remote devices connected via a network and an executing unit which configures a virtual hardware environment and executes a host operating system for causing a guest operating system to control the remote devices, the method including:

transferring a scan instruction issued by the guest operating system to the remote devices by referring to a management table for managing correspondence between the guest operating system and the remote devices by using identification information that does not change dependently on start-up states of the remote devices; and selecting a reply to be transferred to the guest operating system, out of replies sent back by the remote devices by referring to the management table.

[Sixth Form]

The connection management method for the remote device of the fifth form, wherein using a MAC address which is embedded in heartbeat information received from a remote apparatus including the remote devices as the identification information that does not change dependently on the start-up states of the remote devices, and the communication control unit rewrites a destination of the scan instruction to the MAC address and transfers the scan instruction in a case where the guest operating system issues the scan instruction.

[Seventh Form]

The connection management method for the remote device of the fifth or the sixth form, wherein the remote devices are PCI-Express devices subject to the PCI-Express protocol, the method further comprising executing communication between the guest operating system and the remote devices through the virtual bus which is constructed to the remote devices by executing encapsulation based on the PCI-Express protocol.

[Eighth Form]

A computer-readable program recording medium for recording a program to make a computer, which is arranged in a computer system including a bus extending unit which constructs a virtual bus to one or more remote devices connected via a network and an executing unit which configures a virtual hardware environment and executes a host operating system for causing a guest operating system to control the remote devices, execute:

a process of transferring a scan instruction issued by the guest operating system to the remote devices by referring to a management table for managing correspondence between the guest operating system and the remote devices by using identification information that does not change dependently on start-up states of the remote devices; and a process of selecting a reply to be transferred to the guest operating system, out of replies sent back by the remote devices by referring to the management table.

It is to be noted that the eighth form can develop to the second to the fourth forms as well as the first form.

It is assumed that each disclosure of the above-mentioned patent documents is incorporated in the present DESCRIPTION by reference. Within the scope of all disclosures (including Claims) of the present invention and based on the basic technical concept, it is possible to change and adjust the exemplary embodiments or the examples. In addition, it is possible to variously combine various disclosed-elements (including each element of each Claim, each exemplary embodiment, each example, each drawing and the like) and to select the disclosed element within the scope of the disclosures of the present invention. That is, it is apparent that the present invention includes various changes and modifications which a person skilled in the art can achieve based on all of the disclosures, which includes Claims, and the technical concept. Particularly, regarding the range of numerical value which has been described by the present DESCRIPTION, even if there is no specific description of any numerical value or any small range which is within the range of numerical value, the numerical value or the small range should be interpreted as being specifically described.

This application is based upon and claims the benefit of priority from Japanese Patent Application No. 2014-121450, filed on Jun. 12, 2014, the disclosure of which is incorporated herein in its entirety by reference.

REFERENCE SIGNS LIST 100, 100a, 100A, X100 and X500 computer system
101-10n, 10x, and X101-X10n guest OS
110 and X110 host OS
111 virtual BIOS
120 and X120 CPU
120A OS executing unit
130 peripheral device
140, X140 and 140a upstream bridge (bus extending unit (host))
140A bus extending unit
141 and 141a device management table
141A management table
142 and 142a scan result checking unit
142A communication control unit
143, X141 and X421 network adaptor
150, X150 and X510 communication unit
200, X20A, X20B and X200 remote apparatus
210 communication unit
220 and X420 downstream bridge (bus extending unit (remote))
231 to 23n remote device
300 and 600 network
X130 peripheral equipment
X131 device B
X410 Ethernet switch
X600 switch

The invention claimed is:

1. A computer system, comprising:
   a memory; and
   at least one processor configured to implement:
      a bus extender which constructs a virtual bus to one or more remote devices connected via a network; and
      an executer which configures a virtual hardware environment and executes a host operating system for causing a guest operating system to control the remote device, wherein
      the bus extender comprises a communication controller which controls communication between the guest operating system and the remote devices by referring to a management table for managing correspondence between the guest operating system and the remote devices using identification information that does not change dependently on start-up states of the remote devices, and
      wherein, in a case where the guest operating system issues a scan instruction, the communication controller rewrites a destination of the scan instruction to a MAC address which is embedded in heartbeat information received from a remote apparatus including the remote devices, and transfers the scan instruction using the MAC address as the identification information.

2. The computer system according to claim 1, wherein the communication controller functions as a scan result checker which discards, out of replies sent back by the remote devices in reply to a scan instruction issued by a guest operating system, a reply sent back by a remote device not associated with the guest operating system issuing the scan instruction, by referring to the management table.

3. The computer system according to claim 1, wherein
   the remote devices are PCI-Express devices subject to the PCI-Express protocol, and
   the bus extender constructs the virtual bus to the remote devices by executing encapsulation based on the PCI-Express protocol.

4. A connection management method for a remote device in a computer system, the method comprising:
   constructing a virtual bus to one or more remote devices connected via a network and an executer which configures a virtual hardware environment;
   executing a host operating system for causing a guest operating system to control the remote devices,
   transferring a scan instruction issued by the guest operating system to the remote devices by referring to a management table for managing correspondence between the guest operating system and the remote devices by using identification information that does not change dependently on start-up states of the remote devices;
   selecting a reply to be transferred to the guest operating system, out of replies sent back by the remote devices by referring to the management table; and
   rewriting a destination of the scan instruction to a MAC address which is embedded in heartbeat information received from a remote apparatus including the remote devices, and transferring the scan instruction using the MAC address as the identification information, in a case where the guest operating system issues the scan instruction.

5. The connection management method for the remote device according to claim 4, wherein
   the remote devices are PCI-Express devices subject to the PCI-Express protocol,
   the method further comprising executing communication between the guest operating system and the remote devices through the virtual bus which is constructed to the remote devices by executing encapsulation based on the PCI-Express protocol.

6. A computer-readable program recording medium for recording a program executed by a computer, which is arranged in a computer system including a bus extender which constructs a virtual bus to one or more remote devices connected via a network and an executer which configures a virtual hardware environment and executes a host operating system for causing a guest operating system to control the remote devices, the computer executing:
   a process of transferring a scan instruction issued by the guest operating system to the remote devices by referring to a management table for managing correspondence between the guest operating system and the remote devices by using identification information that does not change dependently on start-up states of the remote devices; and
   a process of selecting a reply to be transferred to the guest operating system, out of replies sent back by the remote devices by referring to the management table; and
   a process of rewriting a destination of the scan instruction to a MAC address which is embedded in heartbeat information received from a remote apparatus including the remote devices, and transferring the scan instruction using the MAC address as the identification information, in a case where the guest operating system issues the scan instruction.

* * * * *